US012131599B1

(12) United States Patent
Shah

(10) Patent No.: US 12,131,599 B1
(45) Date of Patent: Oct. 29, 2024

(54) VEHICLE OPERATION AND/OR SIMULATION BASED ON DECISION REGISTRY

(71) Applicant: Zoox, Inc., Foster City, CA (US)

(72) Inventor: Prateek Chandresh Shah, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 354 days.

(21) Appl. No.: 17/538,809

(22) Filed: Nov. 30, 2021

(51) Int. Cl.
*G07C 5/10* (2006.01)
*B60W 50/02* (2012.01)
*G06N 20/00* (2019.01)
*G07C 5/08* (2006.01)

(52) U.S. Cl.
CPC ........... *G07C 5/10* (2013.01); *B60W 50/0205* (2013.01); *G06N 20/00* (2019.01); *G07C 5/085* (2013.01)

(58) Field of Classification Search
CPC .......... G07C 5/10; G07C 5/085; G06N 20/00; B60W 50/0205
USPC ........................................................ 701/31.7
See application file for complete search history.

(56) References Cited

U.S. PATENT DOCUMENTS

| 5,822,580 | A | * | 10/1998 | Leung ...................... G06F 9/465 |
| | | | | 707/999.103 |
| 7,120,559 | B1 | * | 10/2006 | Williams ............ G06F 11/0706 |
| | | | | 702/185 |
| 7,200,525 | B1 | * | 4/2007 | Williams ............... G06F 11/008 |
| | | | | 714/E11.02 |
| 7,516,025 | B1 | * | 4/2009 | Williams ........... G05B 23/0278 |
| | | | | 702/182 |
| 10,521,579 | B2 | * | 12/2019 | Van Os .................. H04L 9/3231 |
| 11,761,770 | B2 | * | 9/2023 | Davis ...................... G10L 25/63 |
| | | | | 701/466 |
| 2019/0018408 | A1 | * | 1/2019 | Gulati ................ G08G 1/09623 |
| 2021/0156700 | A1 | * | 5/2021 | Davis ....................... G10L 17/06 |
| 2021/0255307 | A1 | * | 8/2021 | Bongio ................. G01S 13/723 |
| 2023/0110285 | A1 | * | 4/2023 | Pardo ...................... G06N 3/063 |
| | | | | 706/26 |
| 2023/0110316 | A1 | * | 4/2023 | Pardo ...................... G06F 17/16 |
| | | | | 712/220 |

FOREIGN PATENT DOCUMENTS

| WO | WO-2019152795 | A1 | * | 8/2019 | ........... G06F 21/121 |
| WO | WO-2020205648 | A1 | * | 10/2020 | .......... B60W 30/182 |

* cited by examiner

*Primary Examiner* — Tuan C To
(74) *Attorney, Agent, or Firm* — Lee & Hayes, P.C.

(57) ABSTRACT

Tracking component decisions may comprise generating a data structure in association with an output determined by a component. This data structure, along with one or more data structures generated in association with other outputs generated by the same or different components of the vehicle, may be used to determine a trace that identifies component(s) that determined outputs that affected a particular component's generation of an output. The data structures and/or traces may be used to determine whether a component is the source of an error, a portion of the component that is the source of the error, unintended impacts to unmodified portions of components, among additional or alternate uses discussed herein.

20 Claims, 7 Drawing Sheets

VEHICLE OPERATION AND/OR SIMULATION BASED ON DECISION REGISTRY

BACKGROUND

An autonomous vehicle may include highly complex systems for controlling operations of the vehicle. Such a system may comprise numerous hardware and/or software components, making it difficult to identify which component or components led to an error and/or how modifying a component will change how other components operate and how the autonomous vehicle is ultimately controlled. Something as simple as exchanging hardware for hardware of a same type or making a minor change to a software component may ultimately cause the autonomous vehicle to operate differently.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
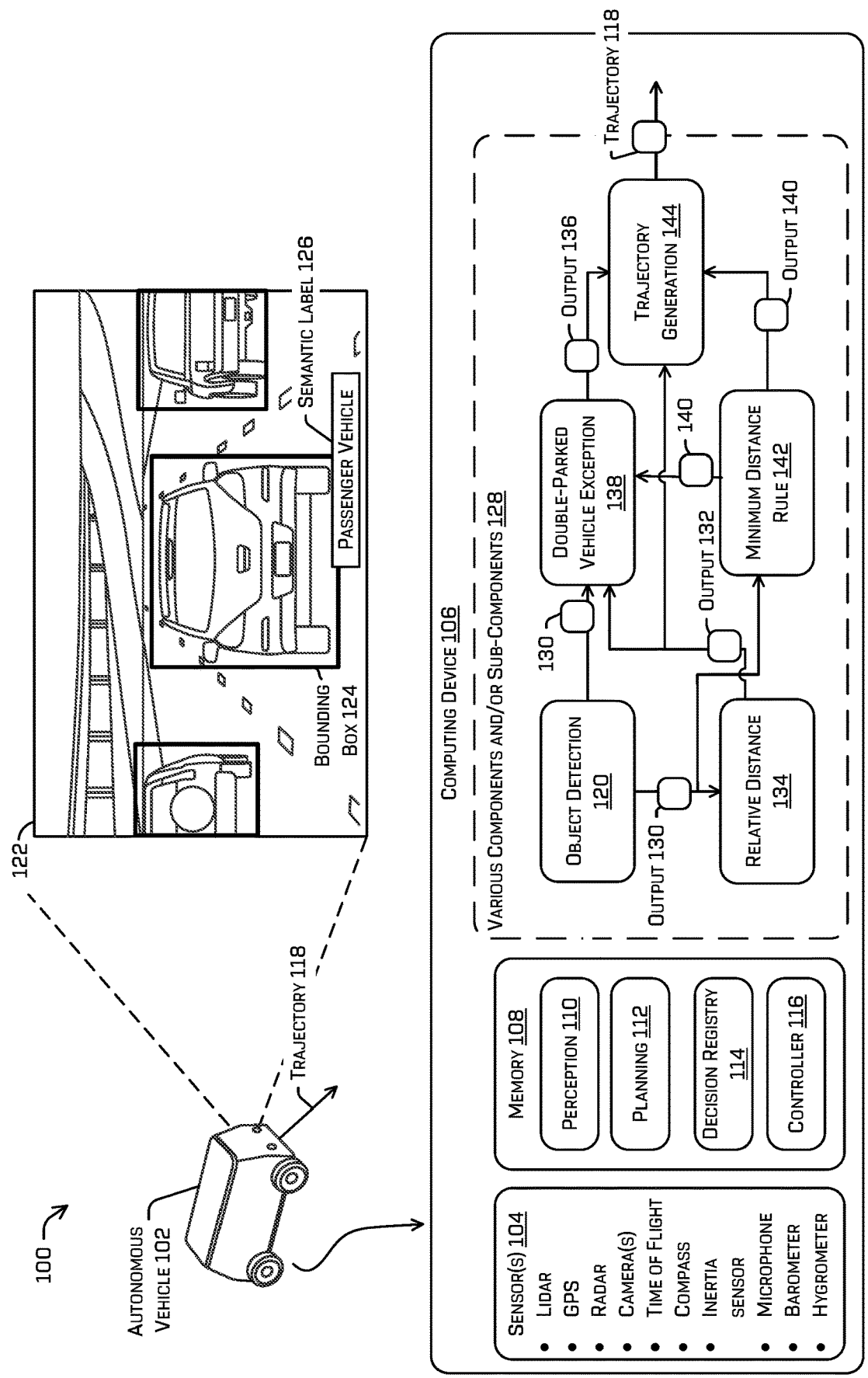
FIG. 1 illustrates an autonomous vehicle and an example scenario in which a component and its subcomponents are activated to accomplish trajectory generation, as an example.

Techniques (e.g., processes and/or machines) for tracking component decisions (e.g., perception and/or planning component decisions) may comprise generating a data structure in association with an output determined by a component. This data structure, along with one or more data structures generated in association with other outputs generated by the same or different components of the vehicle, may be used to determine a trace. In turn, the trace may identify component(s) that determined outputs that affected a particular component's generation of an output. In some examples, a data structure generated according to the techniques discussed herein may be stored as an entry in a decision registry that may be stored as part of log data generated as part of operation of the autonomous vehicle. The decision registry may be used for simulated operation and/or real-world operation of the vehicle. In some examples, generation of a data structure may be performed at a decision registry output point (also referred to herein as a registry point) in the component (e.g., in the code or instructions of the component).

The data structure, trace and/or factors identified by the data structure may be used to detect whether the component associated with the data structures or another component of the system and/or a portion of the component was the source a problem with control of the system. If the component is determined to be the source of the problem, the data structure, trace and/or factors identified by the data structure may be used with other data structures from the decision registry to determine a portion of the component that is likely source of the problem. The data structure, trace and/or factors identified by the data structure may also be used to detect an unintended impact of a modification to a portion of the component on other portions of the component or other components. Additionally, the data structure and/or associated traces may be analyzed during testing to determine portions of a component that have been covered satisfactorily and the system may operate to cause further testing to focus on portions with incomplete coverage (e.g., by changing a testing environment or notifying a test monitor that test scenarios directed at the portions of the component with complete coverage may be skipped in favor of test scenarios directed at the portions of the component with incomplete coverage), among additional or alternate uses discussed herein.

The outputs determined by components may comprise any state of the component, system or vehicle or output determined by a component of an autonomous vehicle. For example, such an output by a component may include determining a distance at which to follow another vehicle, determining a trajectory, joining sensor data of different types, and/or the like. In other words, at a high-level, the output may be a determination/decision performed by a component regarding some portion of perception or control of the vehicle, however small and invisible to passengers or high-level and noticeable. Such determinations may be made by a high-level component, such as a trajectory generation component that guides the movement of the vehicle over near-time horizon (e.g., next 100 milliseconds, 500 milliseconds, 1 second, 3 seconds, any other number); or a low-level sub-component, such as determining a minimum distance to maintain from objects, determining a distance at which to follow another object, or determining whether or not two different portions of sensor data correspond with a same portion of an object. Such a component may include software and/or hardware and may comprise one or more sub-components, for which a data structure may also be generated.

To track a component's determinations that may affect vehicle behavior or object detection, the techniques discussed herein may utilize decision registry output points in the component. In some examples, a decision registry output point may include a module within a component that determines the data structure in response to the component generating a determination. This module may be software and/or hardware. In an additional or alternate example, the module may be an application programming interface (API) or another type of software and/or hardware layer that receives outputs of the component(s) to be tracked and generates a data structure in response to receiving such outputs. For example, the module may be part of a publication-subscription network where the module is a subscriber to messages published by components that are being tracked. The decision registry output points may be manually included in the components (e.g., by a developer or system expert).

The data structure generated in association with a determination may identify the output(s) of one or more components upon which the determination was based, a coarse identifier of the source of the need for the determination, a fine identifier of the source, a coarse result type, a fine result type, one or more factors, and/or a time associated with the determination. The one or more factors identified by a data structure may be different depending on the component and/or output that generated the determination. A factor may identify a common name for the factor in plain language, a value associated with the factor, a limit associated with the factor, and/or a reason associated with the factor. A factor may also be referred to herein as ancillary data.

To give an illustration, the component might be a sub-component of the planning component of an autonomous vehicle for handling double-parked vehicles-a "double-parked vehicle exception component." More specifically, this sub-component may output an indication that an exception may or may not be made that would allow a trajectory generation component to generate a trajectory into a lane associated with oncoming traffic, such as when a double-parked vehicle is likely detected and other parameters, such as a threshold distance to the double-parked vehicle, are satisfied. In generating such a determination, the exception component may receive any object detection (or an indication that no object has been detected), an estimated distance to an object detection, a threshold distance to maintain from the object, and/or the like from other components of the perception system and/or the planning system of the autonomous vehicle.

In a first instance, the component may generate a determination that no exception should be made based on receiving a likelihood that no double-parked vehicle exists from a detection component of the perception system, receiving a likelihood that meets or exceeds a threshold that a drive corridor of the autonomous vehicle is clear, and/or determining that a distance to a double-parked vehicle hasn't been reached. According to the latter example, another component may have determined a threshold distance to maintain from any double-parked vehicles based at least in part on sensor data and output this threshold distance to the exception component. The techniques discussed herein may comprise generating a data structure associated with the determination to output an indication that no exception should be made. In this instance, the data structure may include an indication of the components that the exception component received input from, an indication of which components' inputs were relied upon in making the determination (e.g., in an example where no object detection exists), output from the threshold determining component may not matter for this determination or in another example where the vehicle is beyond the threshold distance from the double-parked vehicle, how the determination was made (e.g., the estimated distance to the object exceeded the threshold), and/or the like.

The data structure may be stored in a decision registry, which may be stored with other log data generated by the vehicle in some examples. A particular entry in the decision registry (i.e., one of the data structures discussed herein) may be associated with a time or indication of a point in operation of the vehicle at which the determination with which the entry is associated was made.

As mentioned above, the data structure, trace and/or factors identified by the data structure may be used to detect whether the component associated with the data structures or another component of the system and/or a portion of the component was the source of a problem with control of the system. For example, in response to an error (e.g., a disengagement of autonomous operations by a monitor, a cost exceeding a certain value, an error thrown by a hardware and/or software component/subcomponent, etc.), a system according to this disclosure may analyze data structures in the decision registry associated with the error (e.g., by time of occurrence and/or generation). The analysis may the determine other data structures in the decision registry that match the data structure (e.g., from previous operations). In this context, a matching data structure may represent an execution of the component that is sufficiently similar based on various criteria and/or a machine-learned matching algorithm (also referred to herein as a machine-learned model). In general, matching of data structures may indicate the data structures, traces and/or factors identified by the data structures are sufficiently similar that, if the input data is not erroneous, the test scenarios or environments upon which the input data is based are functionally the same. Particular matching algorithms and/or criteria may vary from implementation to implementation. For example, some examples may include matching algorithms that match data structures based on wider criteria, such as by grouping data structures generated by a high-level component at a time or point in operation (e.g., data structures generated for a particular clock cycle of the planning component) and perform groupwise matching such that data structures output at the same decision registry output point do not match if the other data structures generated by the other decision registry output points of the high-level component in the respective clock cycles do not also match. In an example, the system may utilize t-Distributed Stochastic Neighbor Embedding (t-SNE) or similar dimensionality reduction techniques. Of course, these are merely examples and various other scopes or grouping requirements may be used in other implementations.

Once other matching data structures have been matched to the data structure, the system may determine if the matching data structures are also associated with the same or similar errors (e.g., with more than a threshold level of regularity or for all the matching data structures). For example, the system may query an error log for similar or matching errors that occurred in association with the matched data structures. If so, the system may output an indication the component is the likely source of the error. If the analysis for data structures in the decision registry do not find that matching data structures are also associated with the same or similar errors, the system may output an indication that the component is not the source of the error. Alternatively, where the decision registry output points do not provide complete coverage of the component, the system may output an indication that the portions of the component with coverage by decision registry output points are not the source of the error. On the other hand, in an example in which a high-level component, such as the planning component, has sufficient coverage by decision registry output points (e.g., as determined by a developer or system expert), the lack of associated errors for matching data structures may indicate that the source of the error was outside the high-level component (e.g., in a component supplying input to the high-level component) or the error itself was erroneous (e.g., an unnecessary disengagement). In some examples, sufficient coverage by the decision registry output points may refer to a distribution of decision registry output points across decision points of the code or instructions of a high level component or another portion of the system that most or all paths through the code may be logged by the decision registry. In a particular example, where the data structures output at decision registry output points of a planning component match with a set of other data structures output by the decision registry output points of the planning component in a previous clock cycle, the test scenario and/or environment (e.g., and by extension, the inputs to the planning component) should be functionally the same and, by extension, the functionally same output from the planning component should not have a different result. If most or all of the matching other data structures are not associated with an error, the error may be determined to be in the determination of the inputs to the planning component.

If the component is instead determined to be the source of the problem, the data structure, trace data and/or factors identified by the data structure may be used with other data structures from the decision registry to determine a portion of the component that is likely the source of the problem. For example, the system may determine other data structures that partially match with the data structure (e.g., where another trace based on the other data structures matches a first portion of the trace but branches away or does not match a second portion of the trace). The system may then determine other partially matching data structures that are not associated with an error (e.g., non-erroneous partially matching data structures) and partially matching data structures that are associated with an error (e.g., erroneous partially matching data structures). The system may then determine, based on the non-matching portion(s) of the trace that differ from trace(s) of the other partially matching data structures and whether the other partially matching data structures were erroneous, the non-matching portion(s) of the trace that may be suspected of being the source of the error. Because the traces may be mapped to software instructions or hardware circuitry of the component, the system may then identify the software instructions or hardware circuitry of the component associated with the non-matching portion(s) of the trace that may be suspected of being the source of the error. A notification may then be provided to developers of the portion of the component that is suspected of being the source of the error.

The data structure, trace and/or factors identified by the data structure may also be used to detect an unintended impact of a modification to a portion of the component on other portions of the component or other components. An unintended impact may be identified by another portion of the component or other components having different execution or operation after the modification, such as an unmodified portion of the component or another component being executed more frequently. For example, an unintended impact resulting from a modification of a "double parked vehicle exception" component may be substantial increase in the frequency of execution of the "distance to the nearest pedestrian" component. The system may identify such a unintended impact by determining, for data structures output at decision registry output points associated with unmodified portions of the component or other components, respective first frequencies at which the data structures associated with unmodified portions of the component appear in association with data structures associated with the modified portions of the component before the modification, determining respective second frequencies at which the data structures associated with unmodified portions of the component appear in association with data structures associated with the modified portions of the component after the modification, determining respective ratios of the respective second frequencies to the respective first frequencies, and flagging or notifying developers of unmodified portions whose associated data structures have a respective ratio that deviates from one by an amount greater than a threshold.

Additionally, the data structure and/or associated traces may be analyzed during testing to determine portions of a component that have been covered satisfactorily and the system may operate to cause further testing to focus on portions with incomplete coverage. For example, the system may continuously or in batches analyze the data structures being added to the decision registry to determine portions of components being executed. For example, the system may determine a count of data structures output by a decision registry output point and/or the paths within the component executed to generate the outputs. The system may aggregate the executions to determine a current coverage of the testing of the system. The current coverage of the testing may be compared to coverage criteria for the testing. The coverage criteria may specify coverages desired for different portions of the components and/or testing scenarios associated with the portions of the components (e.g., 800 executions of the double parked vehicle exception component that include a first set of ranges of test conditions (e.g., distances between objects, driving speeds, other objects, vehicles and/or pedestrians), 500 executions of the double parked vehicle exception component that includes a second set of ranges of test conditions, 500 executions of a distance to pedestrian component that includes a third set of ranges of test conditions). The system may determine which coverages have been satisfied and cause the testing to emphasize portions of the component with incomplete coverage criteria. For example, the system may request or otherwise cause a reconfiguration of the testing environment, notify a test monitor that test scenarios directed at the portions of the component with complete coverage may be skipped in favor of test scenarios directed at the portions of the component with incomplete coverage, and so on.

The techniques discussed herein may improve the safety of an autonomous vehicle by determining a source of errors in software and/or hardware systems of the vehicle, detecting unintended impacts from modifications of components on unmodified portions of components or other components, ensuring that systems of the autonomous vehicle have been used extensively before being relied upon, focusing testing to reduce over testing of sufficiently tested portions of components, and increasing the amount of data available to a planning component for making decisions, among other benefits. Any or all of these improvements may improve the safety and efficacy of operation of an autonomous vehicle. For example, the techniques discussed herein may allow for more efficient testing, which in turn may allow for generation of better trajectories that may protect occupants of vehicles as well as people in the environment around the vehicle. The decision registry and use thereof may improve the efficacy of the autonomous vehicle by reducing wasteful repetitive computations; decrease the number of times the autonomous vehicle needs to transmit a request for assistance to a teleoperations system and increase the confidence that such a request is necessary; and/or the like. Moreover, the decision registry may be used to train, re-train, debug, or the like various components of the autonomous vehicle, which may improve the vehicle's navigation of various scenarios. For example, the decision registry may aid a software developer in troubleshooting and/or modifying code.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle. For example, data structures entered into the decision registry may be generated for real-world and/or simulated operations of the vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

The autonomous vehicle 102 may provide the sensor data received from such sensor(s) 104 to one or more systems of the autonomous vehicle 102 to accomplish a variety of functions of the autonomous vehicle. For example, one or more systems may control a passenger ride experience (e.g., temperature/humidity control, interior display control, door control functionality, seat functionality), a localization and/or mapping system may generate a map of surroundings of the autonomous vehicle and/or a position and/or orientation of the autonomous vehicle 102 within a map, perception system that may detect and track object(s) in an environment of the autonomous vehicle, a prediction system that may predict future positions, velocities, and/or accelerations of objects in the environment, a planning system that may determine a trajectory for controlling motion of the autonomous vehicle, etc. These systems may, in turn, include one or more components.

In at least one example, computing device(s) 106 may comprise a memory 108 storing a perception component 110, a planning component 112, decision registry 114, and/or controller(s) 116. The perception component 110, the planning component 112, the decision registry 114, and/or the controller(s) 116 may include one or more machine-learned (ML) models and/or other computer-executable instructions. In general, the perception component 110 may determine what is in the environment surrounding the vehicle 102 and the planning component 112 may determine how to operate the vehicle 102 according to information received from the perception component 110. For example, multiple sub-components of the perception component 110 and/or planning component 112 may be used to determine trajectory 118 based at least in part on the perception data and/or other information such as, for example, one or more maps, localization information (e.g., where the vehicle 102 is in the environment relative to a map and/or features detected by the perception component 110), and/or a path generated by a high level mission planner of the planning component 112.

In some examples, the perception component 110 may receive sensor data from the sensor(s) 104 and determine data related to objects in the vicinity of the vehicle 102, such as the static and/or dynamic data. For example, such a detection may be conducted by one or more object detection component(s) 120, which may comprise one or more ML model(s) and/or ML or other processing software and/or hardware pipeline(s). In the depicted example, the sensor data comprises an image 122 and an object detection generated by one or more object detection sub-components (120) of the perception component 110 may comprise a bounding box 124 indicating the existence of an object represented in the image 122 and a semantic label 126 indicating an object type associated with the object, i.e., a "passenger vehicle" in this instance. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications generated by sub-component(s) of the perception component may distinguish between different object types such as, for example, a passenger vehicle, a pedestrian, a bicyclist, a delivery truck, a semi-truck, traffic signage, and/or the like. The perception component 110 may additionally or alternatively determine a track associated with an object, wherein the track may comprise a historical, current, and/or predicted object position, velocity, acceleration, and/or heading. The data produced by the perception component 110 may be collectively referred to as perception data. Once/as the perception component 110 generates perception data, the perception component 110 may provide the perception data to the planning component 112. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110 to determine one or more trajectories, control motion of the vehicle 102 to traverse a path or route, and/or otherwise control operation of the vehicle 102, such as controlling passenger-facing features of the vehicle such as exterior doors, HVAC system(s), and/or the like, though any such operation may be performed in various other components (e.g., localization may be performed by a localization component, which may be based at least in part on perception data). For example, the planning component 112 may determine a route for the vehicle 102 from a first location to a second location; determine a smooth trajectory from a coarse trajectory received from the guidance system; generate, substantially simultaneously and based at least in part on the path and perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to the controller(s) 116 for actuating drive components of the vehicle 102. FIG. 1 depicts an example of such a trajectory 118, represented as an arrow indicating a heading, velocity, and/or acceleration, although the trajectory itself may comprise instructions for controller(s), which may, in turn, actuate a drive system of the vehicle 102.

The trajectory 118 may comprise instructions for controller(s) 116 of the autonomous vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. In some examples, the controller(s) may comprise software and/or hardware for actuating drive components of the vehicle 102 sufficient to track the trajectory 118.

In some examples, the decision registry 114 may create a data structure associated with an output of interest by any of the components or sub-components of the autonomous vehicle, whether they are illustrated in FIG. 1 or not. As mentioned above, in some examples, outputs of interest may be outputs associated with decision registry output points which may be manually determined and/or included in the components. The perception component 110 and planning component 112 are discussed in more depth here so as to provide examples of the kinds outputs that may be tracked by the decision registry 114 and how the decision registry may be used to create traces, determine components that are/are not the likely source of an error, determine unintended impacts on unmodified portions of the system, determine software and/or hardware usage/coverage for the purposes of focusing testing on software and/or hardware that has not been covered sufficiently to satisfy coverage criteria, and so on.

In the illustrated example, various components and/or sub-component(s) (128) of the perception component 110 and/or planning component 112 may generate various outputs, i.e., output 130 generated by object detection sub-component 120, output 132 generated by a relative distance component 134, output 136 generated by a double-parked vehicle exception component 138, output 140 generated by a minimum distance rule component 142, and the trajectory 118 generated by a trajectory generation component 144. For example, an object detection comprising the bounding box 124 and/or the semantic label 126 may be output as output 130 to the relative distance component 134 and/or the double-parked vehicle exception component 138. The relative distance component 134 may receive one or more object detections associated with one or more sensor types and may determine the minimum distance between the vehicle 102 and the nearest object and/or the nearest object in a corridor associated with a current trajectory being executed by the vehicle 102. This relative distance may be output by the relative distance component 134 as an output 132 to at least double-parked vehicle exception component 138 and/or others, such as the trajectory generation component 144.

Another component, the minimum distance rule component 142 may determine a threshold distance based at least in part on various sensor data, perception data, the object detection, and/or other data. The threshold distance determined by the minimum distance rule component 142 may indicate a minimum distance the autonomous vehicle should maintain from other objects in the environment. This threshold distance may be output as output 140 to the double-parked vehicle exception component 138 and/or the trajectory generation component 144 in at least one example.

The double-parked vehicle exception component 138 may determine whether to generate an indication that an exception may be made that would allow the trajectory generation component 144 to generate a trajectory into a lane associated with oncoming traffic. The double-parked vehicle exception component 138 may use the object detection received as output 130 to determine whether a double-parked vehicle exists in the first place (e.g., the object detection may include an indication of whether or not an object is in a "double-parked" state, where the object is blocking the lane and appears to be stopped with no intention of moving within a threshold amount of time). If no such indication is received that such an object exists, the double-parked vehicle exception component 138 may output an indication that no exception should be made, as output 136. In another example, if such an object exists, the double-parked vehicle exception component 138 may determine whether the relative distance (output 132) is within a threshold distance or time of the minimum distance (output 140) or if the relative distance is equal to or less than the minimum distance. In such an instance the double-parked vehicle exception component 138 may output an indication to make an exception, as output 136.

The trajectory generation component 144 may generate one or more candidate trajectories based at least in part on whether an exception can be made, according to output 136; a minimum distance to maintain from other objects, according to output 140, and/or other inputs, such as sensor data, object detection(s), and/or the like. In some examples, the trajectory generation component 144 or another component of the planning component 112 may select one of these components based at least in part on a complex set of rules and/or an ML pipeline for scoring the candidate trajectory (ies). Regardless, trajectory 118 may ultimately be output and implemented by the autonomous vehicle 102, such as by controller 116.

In the limited example discussed herein, the decision registry 114 may generate (e.g., create, populate) a first data structure in association with output 130, a second data structure in association with output 132, a third data structure in association with output 136, a fourth data structure in association with output 140, and/or a fifth data structure in association with trajectory 118. These data structures may be stored as entries in the decision registry 114 and may be the same or different from each other. To give a limited example, the data structure generated in association with trajectory 118 may identify a time that the trajectory 118 was output, components upon which the trajectory 118 is based, either directly (e.g., double-parked vehicle exception component 138, minimum distance rule component 142 in the depicted example) and/or remotely (e.g., relative distance component 134, object detection component 120, sensor(s) 104); factors that influenced the determination directly (e.g., output 136 indicated that an exception was permitted by the double-parked vehicle exception component 138 and the trajectory 118 is associated with an oncoming lane); a result of the determination (e.g., a coarse indication, such as "successful merge," or a fine indication, such as autonomous vehicle 102 successfully merged into the oncoming lane and re-merged into the original lane); the name of the component that generated the output; the name of and/or values associated with the output; etc.

To give another example, the data structure associated with output 136 may indicate a name of the component, a name of the output, a value of the output, a source of the determination (e.g., an object was detect in the lane that the autonomous vehicle 102 is operating in), factor(s) upon which the determination was based (e.g., the relative distance (output 132), the threshold distance (output 140), a reason, such as "value met or exceeded"), component(s) associated with the factors, an outcome, and/or the like. In some examples, the factor(s) may identify a value that led to the determination (e.g., the relative distance from the vehicle to the object), a limit that led to the determination (e.g., the threshold upon which the determination was based at least in part), and a reason indicating the interaction between the value and the limit (e.g., the value exceeded the limit, the value equaled the limit, the value was less than the limit). The reasons discussed above deal primarily with values received from other components or determined by the component and comparison thereof to a threshold, but the reason may be different based on the type of component(s) and outputs involved.

Example System

Figure 2:
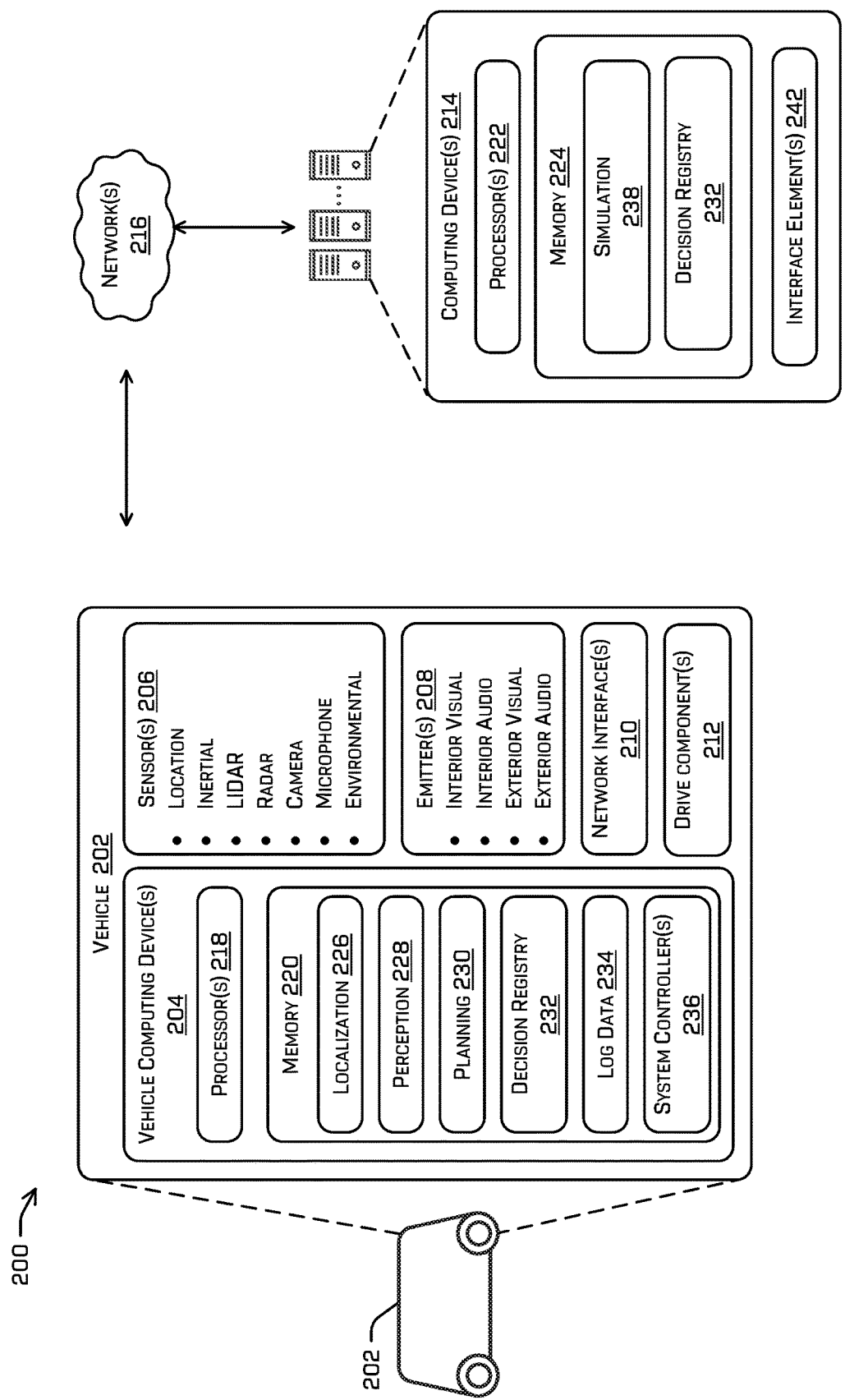
FIG. 2 illustrates a block diagram of an example autonomous vehicle architecture comprising a decision registry for tracing factors upon which determinations are based, reproducing vehicle behavior, detecting errors and/or error types, detecting failed component fixes, etc.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, decision registry 232 (which may be software and/or hardware, e.g., a portion may be hardware, such as GPU(s), CPU(s), FPGA(s), ASIC(s), and/or other processing units), log data 234, and/or system controller(s) 236. Perception component 228 may represent perception component 110, planning component 230 may represent planning component 112, decision registry 232 may represent decision registry 114, and system controller(s) 236 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The decision registry 232 may operate on the vehicle 202 and/or on the computing device(s) 214. In some examples, the decision registry 232 may be downstream (receive input) from at least some components of the perception component and/or the planning component 230. Although, in at least some examples, the position of the decision registry 232 in the pipeline may be irrelevant. In some examples, the decision registry 232 may comprise a portion of storage in memory 220 and/or memory 224, application programming interface(s) (API(s)), hook(s), a subscribing component in a publish-subscribe network, a sub-component of a component, and/or any other component sufficient for identifying actions of interest by a component of the vehicle 202.

For example, the decision registry 232 may generate a data structure in association with all or particular determinations of the double-parked vehicle exception component 138 of the planning component 112. To do so, the decision registry 232 may comprise a hook or a sub-component within the decision registry 232 to monitor actions of the double-parked vehicle exception component 138 and generate and/or transmit data to the decision registry 232 so that the decision registry 232 may generate and store the data structure. In an additional or alternate example, the double-parked vehicle exception component 138 may include a decision registry output point which may be a call an API of the decision registry 232 when the double-parked vehicle exception component 138 commits an action of interest. In yet another additional or alternate example, the decision registry 232 may receive output(s) of the double-parked vehicle exception component 138 via a publish-subscribe network, such as where the double-parked vehicle exception component 138 comprises a publisher and the decision registry 232 comprises a subscriber on the publish-subscribe network.

Regardless, the decision registry 232 may receive data necessary for generating the data structure associated with a determination and/or decision registry output point, which may comprise receiving the data from the monitored component itself, a sub-component thereof, a hook or similar monitor, and/or a combination thereof. Once the decision registry 232 receives such data, the decision registry 232 may generate and store the data structure discussed herein. The stored portion of the decision registry 232 may be transmitted as part of or in association with log data 234.

In some examples, the log data 234 may comprise sensor data, perception data, planning data, and/or any other raw data or determination of any component or sub-component of the autonomous vehicle. In some examples, an entry in the decision registry 232 may comprise an identifier of a portion of the log data with which the entry is associated. For example, the log data may comprise a determination to control the autonomous vehicle according to a trajectory at a first time. The decision registry 232 may have generated and stored a data structure in association with such a determination and the data structure may identify the determination, the trajectory, and/or the sensor data associated with the first time and/or the first time itself.

In some examples, the log data 234 may be transmitted to the computing device(s) 214 for storage. In at least one example, the log data 234 may be stored on a temporary basis at the vehicle 202, streamed or otherwise transmitted to the computing device(s) 214 for more permanent storage, and deleted from or deprioritized in storage on the vehicle 202 once a confirmation of storage at the computing device(s) 214 has been received. In some examples, decision registry entry(ies) may also be transmitted to the computing device(s) 214 for storage. In at least one example, decision registry entry(ies) may be associated with the log data 234 and may be transmitted contemporaneously or sequentially to the computing device(s) 214. The decision registry 232 may form an interconnection/association between portions of log data 234 and/or hardware and/or software components of the vehicle.

Memory 224 may additionally or alternatively include a simulation component 238 and/or the decision registry 232. In some examples, the simulation component 238 may receive scenario data, which may comprise sensor data, scenario instructions, and/or a scenario data structure. In some examples, the scenario data structure may comprise a position, orientation, and/or characteristics of static object(s), dynamic object(s), and/or the simulated vehicle in the environment, which may correspond to real-time operation of an autonomous vehicle and/or may correspond to simulated operation of the autonomous vehicle. In some examples, a planning component 230 of the autonomous vehicle may generate instructions for controlling the simulated vehicle in an agnostic manner to the simulation (e.g., the instructions generated by the planning component may be the same as those generated for a similar real-world situation). The operation of the planning component may be tested in this manner. In some examples, a component may translate instructions generated by the planning component to instructions for controlling the simulated vehicle in the simulated environment (e.g., updating a simulated state associated with the simulated vehicle, which may comprise a position, orientation, velocity, acceleration, heading, and/or the like associated with the simulated vehicle).

The scenario data may additionally or alternatively comprise an indication of an object type associated with one or more objects and/or characteristics associated with the one or more objects (e.g., a position, velocity, acceleration, heading, material type, kinematic coefficient). Any of the data discussed herein may be part of the scenario data structure associated with a portion of log data. The scenario data structure may comprise a two-dimensional image, a publish-subscribe message, and/or the like. In some examples, an entry in the decision registry 232 or log data identified thereby may be used to generate the scenario data structure.

In some examples, the simulation component 238 may instantiate, based at least in part on the scenario data, a simulated environment, according to any of the techniques discussed herein. For example, the simulation component 238 may procedurally generate a simulated environment based at least in part on a set of template models associated with the object types and/or sensor data and/or perception data indicated in the log data 234. For example, the set of template models may comprise three different passenger vehicle models, four different pedestrian models, and/or the like. Any number of different models may exist. In some examples, a template model may comprise a three-dimensional model of a surface of an object without any texturing, although in additional or alternate examples, the model may comprise texture.

The template model may comprise a polygon mesh, a triangle mesh, and/or the like. In some examples, models associated with dynamic objects may have a higher polygon count than models associated with static objects. In some examples, the simulated environment may comprise surface models and lack lighting and/or textures. In additional or alternate examples, the simulated environment may comprise lighting and/or textures, but the techniques described herein work without lighting and/or textures. The simulated environment may comprise a model of the simulated vehicle. In some examples, instantiating the environment portion of the simulated environment may be based at least in part on log data, scenario data, and/or map data and objects in the environment may be based at least in part on instructions received as part of the scenario data (e.g., instructions generated based at least in part on user selection (s) and/or interaction with a user interface, procedurally-generated instructions).

As described herein, the localization component 226, the perception component 228, the planning component 230, the decision registry 232, simulation component 238, and/or other components of the system 200 may comprise one or more ML models. For example, the localization component 226, the perception component 228, the planning component 230, and/or the decision registry 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as a Pixor model, in some examples.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure. In some examples, the decision registry 232 discussed herein and/or an ML model may comprise processor-executable instructions stored in a memory of the computing device(s) 204 and/or accessible thereto, hardware, and/or some combination thereof (e.g., a field-programmable gate array (FPGA), application-specific integrated circuit (ASIC)).

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, and may validate the perception data and/or path generated by a trajectory generation component, and/or transmit instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process for Generating Decision Registry Entry(ies)

Figure 3:
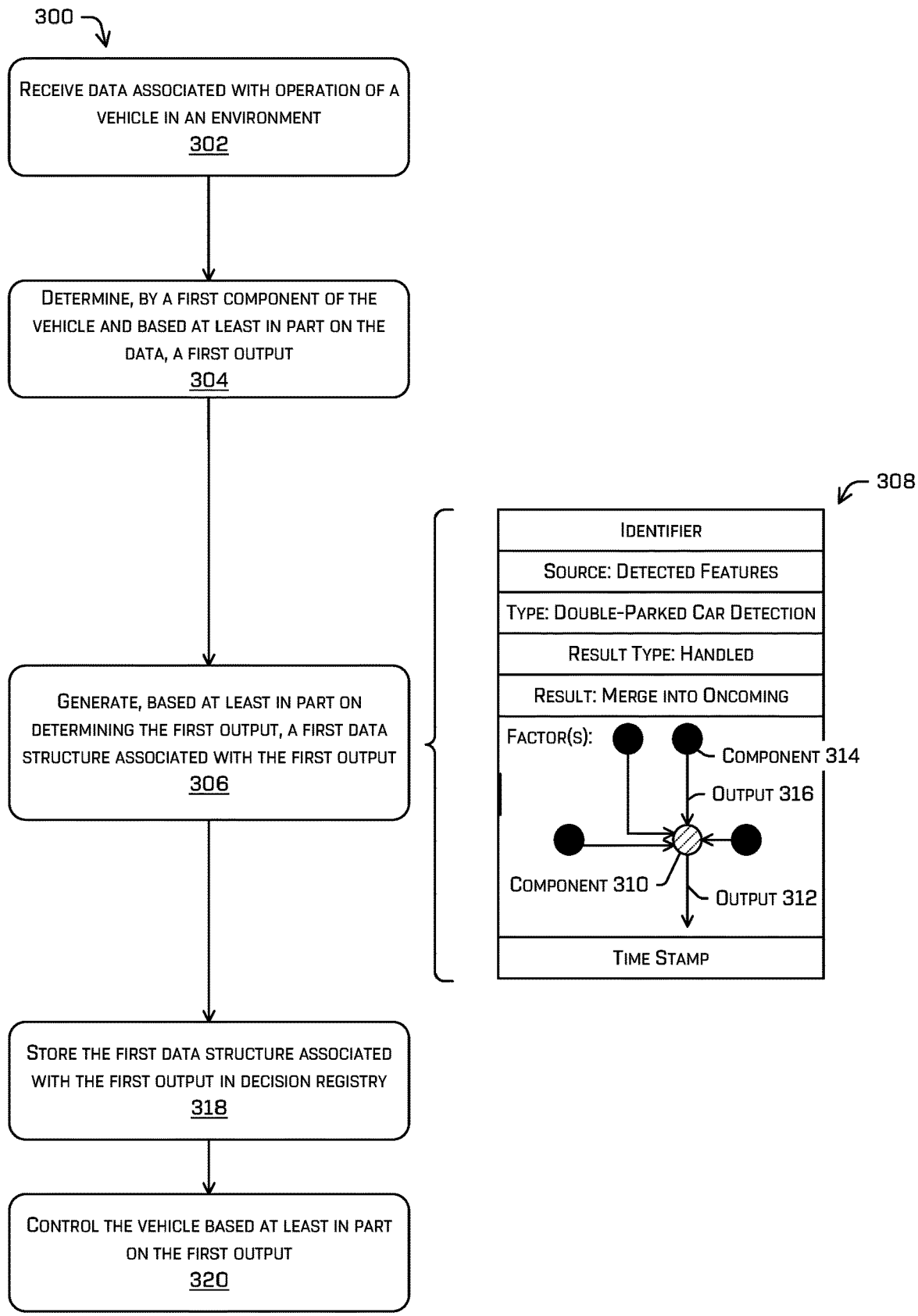
FIG. 3 illustrates a flow diagram of an example process executed at an autonomous vehicle for tracking, in a decision registry, determinations made by various components of a vehicle.

FIG. 3 illustrates a pictorial flow diagram of an example process 300 executed at an autonomous vehicle and/or a simulation component for tracking, in a decision registry, determinations made by various components of a vehicle.

At operation 302, example process 300 may comprise receiving data associated with operation of a vehicle in an environment. For example, operation 302 may comprise receiving sensor data, perception data, planning data, and/or any other data generated by or in association with the vehicle, such as log data.

At operation 304, example process 300 may comprise determining, by a component of the vehicle and based at least in part on the data, a first output. Such an output may be identified as an action of interest by the decision registry (e.g., by a decision registry output point) and the component that generated the determination may be a component of interest. The decision registry may monitor component(s) of interest to detect when a component commits to an action of interest (e.g., via a hook, API, publish-subscribe message, direct transmission, or any of the other messages discussed above), such as operation 304. In some examples, a rule set may identify an action of interest and/or a component of interest to track—in other words, the decision registry may track actions of a particular type across one or more components, actions of a particular type committed by a particular component, and/or all actions of a particular component. In some examples, a user interface may allow a user to modify the rule set and identify the action(s) and/or component(s) for tracking.

A component of interest, such as the first component, may comprise any component or sub-component of the autonomous vehicle that is being tracked by the decision registry. Common components of interest may include but not be limited to high-level determinations of the planning component, lower-level determinations of sub-components of the planning component, high-level outputs of the perception component, and/or lower-level determinations of sub-components of the perception component. It is understood, however, that the techniques may be extended to any other component, including planning component(s) for passenger experience, such as component(s) that control lighting, HVAC, passenger entry(ies) and/or windows, and/or the like; and/or exterior vehicle functions such as, vehicle lighting, vehicle speakers, vehicle passenger interfaces, and/or the like; etc. Further, while discussed in the context of an output from a component or subcomponent (e.g., as a normal output or product of the component or subcomponent), implementations are not so limited. For example, in some examples, the decision registry output point may be configured to output an internal state of the component, a mid-determination value, or other data determined and/or maintained during the operation of the component.

To give a more concrete example, without limitation, an action of interest may include a determination: to follow an object, of a speed at which to operation the vehicle, to stop, to yield, to conduct an all-way stop protocol, to modify an operating parameter of a sensor (e.g., changing the way the sensor operates), to cross a double-yellow line or otherwise enter a lane associated with oncoming traffic (e.g., due to construction, a double-parked vehicle, etc.), to change lanes, to merge, to yield to a crosswalk, to yield to a pedestrian or animal, to stop at a mission endpoint, to react to a cut-in or an agent that is acting out-of-turn, to identify a traffic light as being in a particular state, to control the autonomous vehicle according to a custom trajectory, to open or close a passenger door or window, etc. The list is certainly not exhaustive and could include lower-level outputs and/or states, such as the estimated distance to an object, whether or not an exception can be made, various thresholds set by a component and determined based at least in part on sensor and/or perception data, etc.

At operation 306, example process 300 may comprise generating, based at least in part on determining the first output, a first data structure associated with the first output. FIG. 3 depicts an example portion of such a data structure, example data structure 308. In some examples, the data structure may comprise any of the following, depending on the type of determination and/or the component:

An identifier that may indicate a determination type, one or more vehicles or objects that the determination corresponds to, component(s) that generated the determination, location(s) or other indication(s) of the vehicle or object's progress, and/or a value (e.g., a hash or sequential value);

A source type that indicates the coarse-grained source of the reason for the determination (e.g., a software or hardware component or system, such as a double-parked exception might be triggered because of a double-parked vehicle detection, which is a feature detection received from the planning component);

A source that indicates a fine-grained source for the determination (e.g., a software or hardware function or subsystem, such as double-parked vehicle detected, four-way stop detected, yellow light detected, another vehicle moved out-of-turn or cut-in);

A result type that indicates a coarse-grained result of the determination (e.g., handled, partially handled, passed, teleoperations called);

A result that indicates a fine-grained result of the determination (e.g., yield, merge, continue, emergency maneuver);

One or more factors that resulted in the determination, whether upstream or downstream factors;

Auxiliary data that may indicate any additional data; and

A time (e.g., a time at which the determination was made and/or a future time if the determination is associated with a prediction, for example).

In some examples, the data structure may identify one or more factors associated with a single determination. A factor may comprise an additional data structure, which may comprise a name of the factor (e.g., in common parlance: distance from double-parked vehicle too great, estimated velocity untrustworthy, confidence that pedestrian is gone and not hidden too low), a value that led to the determination, a limit associated with the decision, a reason (e.g., how the limit and the value interact), and/or any additional information. For example, the example in FIG. 1 is structured to give an easy example of two such factors-double-parked vehicle exception due to a distance threshold being met and double-parked vehicle no exception due to a distance threshold not being met. For example, a factor named "double-parked vehicle exception due to a distance threshold being met," in common parlance, may identify the name, the value may be the estimated distance to the double-parked vehicle detection, the limit may be the threshold distance generated by the minimum distance rule component, and the reason may be that the estimated distance is less than or equal to the minimum distance or within a threshold of the minimum distance.

In some examples, the factor(s) may identify the output(s) and/or state(s) upon which the first output was based and/or the component(s) that output such output(s) and/or state(s). For example, FIG. 3 illustrates the first component 310 as a circle with hashes and the first output as output 312 and the components upon which the first component 310 determined the output 312 as filled-in circles, such as component 314, which determined output 316. The decision registry identifies component 310 as having relied on the output 316 to determine output 312.

At operation 318, example process 300 may comprise storing the first data structure associated with the first output in the decision registry.

At operation 320, example process 300 may comprise controlling the vehicle based at least in part on the first output. While shown as following operation 318, in some examples, operation 320 may be performed in parallel with operation 318. Other variations are possible.

Figure 4:
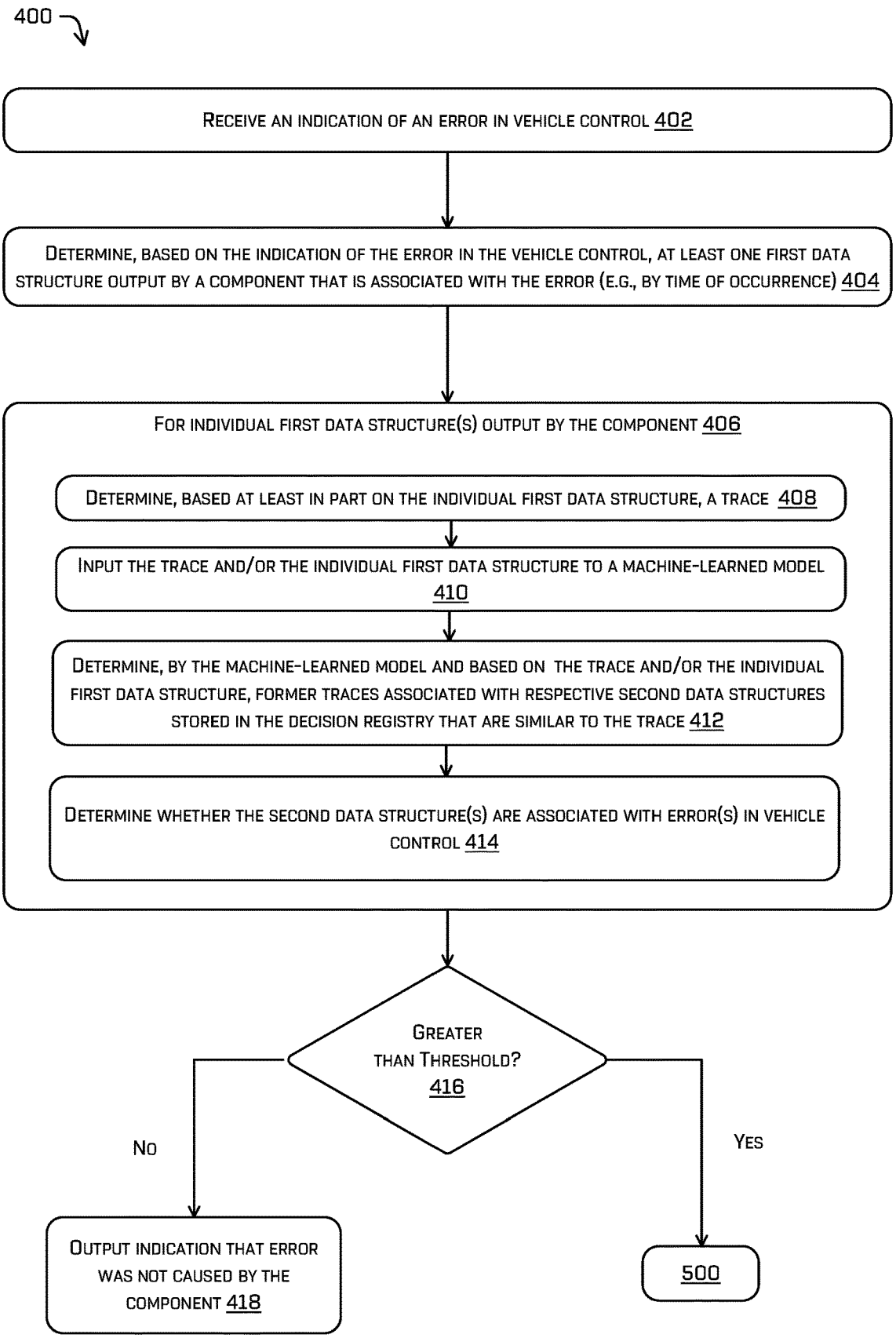
FIG. 4 illustrates a flow diagram of an example process for using the decision registry to determine whether the component associated with the data structures or another component of the system and/or a portion of the component was the source of a problem with control of the system, and/or other examples.

Example Process for Determining Whether the Component Associated with the Data Structures was the Source of a Problem with Control of the System FIG. 4 illustrates a flow diagram of an example process 400 for using the decision registry to determine whether the component associated with the data structures or another component of the system and/or a portion of the component was the source of a problem with control of the system, and/or other examples. Example process 400 may occur on-vehicle or at another computing device, such as at a remote computing device such as a distributed computing service for training an ML model, a teleoperations computing device for servicing a teleoperations request generated by the vehicle, a computing device used by a vehicle engineer to debug and/or monitor operations of the vehicle, and/or the like. In at least one example, example process 400 may be a stand-alone process conducted based at least in part on receiving one or more entries of a decision registry or, in another example, example process 400 may be used as part of one or more other processes.

At operation 402, example process 400 may comprise receiving an indication that an error occurred in controlling the vehicle. In some examples, example process 400 may not include operation 402, such as where the vehicle has not detected that an error has occurred, where the trace is determined to detect an error, or in an instance where the trace is being used for other purposes. In at least one example, the indication of the error may be based at least in part on user input at a user interface (e.g., a disengagement), and/or based at least in part on a self-monitoring component of the vehicle, such as a trajectory-checking component that determines that a trajectory is unsuitable for a scenario and/or associated with a confidence score that fails to meet or exceed a threshold.

At operation 404, example process 400 may comprise determining, based on the indication of the error in the vehicle control, at least one first data structure output by a component that is associated with the error (e.g., by time of occurrence). For example, operation 404 may include searching the decision registry to determine the at least one first data structure. In some examples, the at least one first data structure may include a plurality of data structures determined by various components at this time of the error, within some range of time of the error, or the most recent data structures output by the various components preceding the time of the error.

At operation 406, example process 400 may perform operations 408-414 for individual first data structures of the at least one first data structure. In some examples but without limitation, the example process 400 may perform the operations 408-414 for each of the at least one first data structures.

At operation 408, the example process 400 may determine, based at least in part on the individual first data structure, a trace. Operation 408 may comprise using one or more factors identified by the individual first data structure to reconstruct a set of reason(s), output(s), and/or component(s) upon which the respective output was based, wherein the individual first data structure was generated based at least in part on the respective output. In at least one example, operation 408 may use the factor(s) to identify the output(s) and/or component(s) upon which an respective output was based, at least in part, up to a depth that may be specified by the process that triggered the trace or regardless of depth. For example, the depth may specify a depth of one, which may indicate components that generated outputs received directly by the component of interest; a depth of two may indicate the previously-mentioned components along with any components whose outputs were provided as inputs to those components; and so on. In some examples, the depth may be unspecified and the trace may be determined up to any depth.

At operation 410, the example process 400 may input the trace and/or the individual first data structure to a machine learned model. At operation 412, the example process 400 may determine, by the machine learned model and based on the trace and/or the individual first data structure, former traces associated with respective second data structure stored in the decision registry that are similar to the trace (e.g., from previous times including the same run, previous runs, and simulated runs of the vehicle). As discussed above, the analysis may determine other data structures in the decision registry that match the individual first data structure. In this context, a matching data structure may represent an execution of the component that is sufficiently similar based on various criteria and/or a machine-learned matching algorithm. In general, matching of data structures may indicate the data structures, traces and/or factors identified by the data structures are sufficiently similar that, if the input data is not erroneous, the test scenario or environment upon which the input data is based are functionally the same. The particular matching algorithms and/or criteria may vary from implementation to implementation. For example, some examples may include matching algorithms that match data structures based on wider criteria, such as by grouping data structures generated by a high-level component at a time or point in operation (e.g., data structures generated for a particular clock cycle of the planning component) and perform group-wise matching such that data structures output at the same decision registry output point do not match if the other data structures generated by the other decision registry output points of the high-level component in the respective clock cycles do not also match. Of course, this is merely an example and various other scopes or grouping requirements may be used in other implementations.

At operation 414, the example process 400 may include determining whether the second data structure(s) are associated with error(s) in the controlling the vehicle. In some examples, once other matching data structures have been matched to the individual first data structure, the system may determine if the matching data structures are also associated with the same or similar errors. Further, in some examples, at 414, the example process 400 may include determining a regularity with which the matching data structures are associated with the same or similar errors.

At operation 416, the example process 400 may determine whether the matching data structures of individual first data structures are also associated with the same or similar errors (e.g., with more than a threshold level of regularity or for all the matching data structures). If so, the example process 400 may continue to example process 500. If not, example process 400 may continue to operation 418 where the example process may output an indication that the error in vehicle control was not, or was likely not, caused by the component. More particularly, the system may output an indication that the portions of the component with coverage by decision registry output points are not the source of the error. In an example in which a high-level component, such as the planning component, has sufficient coverage by decision registry output points (e.g., as determined by a developer or system expert), the lack of associated errors for matching data structures may indicate that the source of the error was outside the high-level component (e.g., in a component supplying input to the high-level component) or the error itself was erroneous (e.g., an unnecessary disengagement or false alarm). In a particular example, where the data structures output at decision registry output points of a planning component match with a set of other data structures output by the decision registry output points of the planning component in a previous clock cycle, the test scenario and/or environment (e.g., and by extension, the inputs to the planning component) should be functionally the same and, by extension, the functionally same output from the planning component should not result in a different result. If most or all of the matching other data structures are not associated with an error, the error may be determined to be in the determination of the inputs to the planning component.

Figure 5:
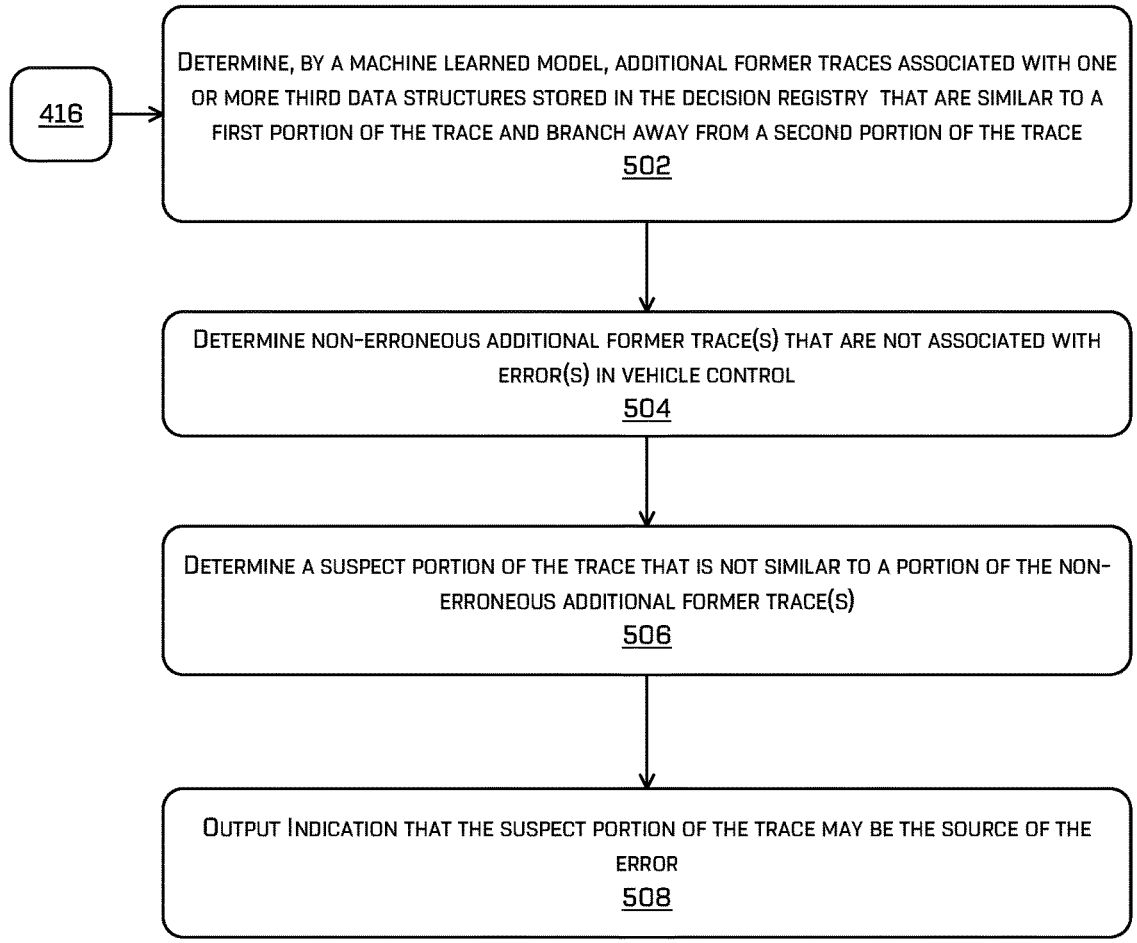
FIG. 5 illustrates a flow diagram of an example process for identifying, for a component identified as the source of an error, a portion of the component that is the likely source of the error.

FIG. 5 illustrates a flow diagram of an example process 500 for identifying, for a component identified as the source of an error by example process 400, a portion of the component that is the likely source of the error. In some implementations, operation 502 of example process 500 may follow operation 416 of the example process 400. Alternatively or in addition, the example process 500 may be performed separately from example process 400 based on the same or similar data as determined by example process 400 and discussed above.

At operation 502, example process 500 may comprise determining, by a machine learned model, additional former traces associated with one or more third data structures stored in the decision registry that are similar to a first portion of the trace but that branch away from or do not match a second portion of the trace. Stated another way, the system may determine other data structures that partially match with the individual first data structures.

At operation 504, the example process 500 may comprise determining non-erroneous additional former trace(s) among the matching data structures determined at operation 502 (e.g., additional former trace(s) that are not associated with error(s) in vehicle control). Then, at operation 506, the example process 500 may comprise determining a suspect portion of the trace that is not similar to a portion of the non-erroneous additional former traces. In some examples, the system may determine partially matching data structures that are not associated with an error (e.g., non-erroneous partially matching data structures) and partially matching data structures that are associated with an error (e.g., erroneous partially matching data structures). The system may then determine the non-matching portion(s) of the trace that may be suspected of being the source of the error based on the non-matching portion(s) of the trace that differ from trace(s) of the other partially matching data structures and whether the other partially matching data structures were erroneous.

Then, at operation 508, the example process 500 may output an indication that the suspect portion of the trace may be the source of the error. In some examples, because the traces may be mapped to software instructions or hardware circuitry of the component(s), the system may identify the software instructions or hardware circuitry of the component associated with the non-matching portion(s) of the trace that may be suspected of being the source of the error.

Figure 6:
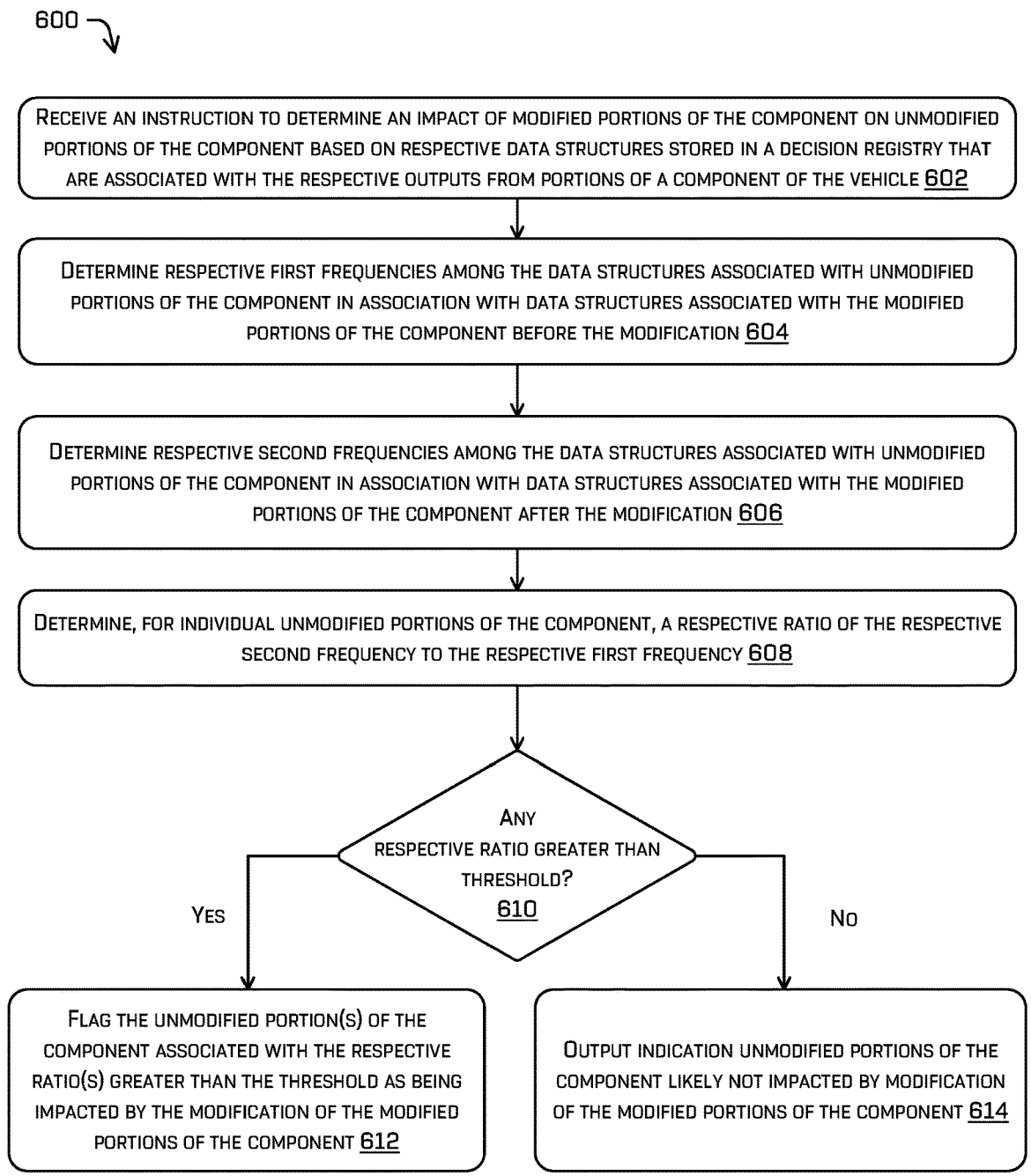
FIG. 6 illustrates a flow diagram of an example process for detecting, using the decision registry, an unintended impact of a modification to a portion of the component on other portions of the component or other components of the system.

Example Process for Determining Unintended Impact of Modifications of Unmodified Portions of Components FIG. 6 illustrates a flow diagram of an example process 600 for detecting, using the decision registry, an unintended impact of a modification to a portion of the component on other portions of the component or other components of the system. An unintended impact may be identified by another portion of the component or other components having different execution or operation after the modification, such as an unmodified portion of the component or another component being executed more frequently. For example, an unintended impact resulting from a modification of a "double parked vehicle exception" component may be substantial increase in the frequency of execution of the "distance to the nearest pedestrian" component. An unintended impact may be identified by another portion of the component or other components having different execution or operation after the modification, such as an unmodified portion of the component or another component being executed more frequently. For example, an unintended impact resulting from a modification of a "double parked vehicle exception" component may be substantial increase in the frequency of execution of the "distance to the nearest pedestrian" component. Example process 600 may be conducted on-vehicle or on a remote computing device, depending on the use case—at least part of example process 600 may be used in conjunction with one or more simulations and/or in conjunction with one or more on-vehicle executions.

At operation 602, the example process 600 may comprise receiving an instruction to determine an impact of modified portions of a component on unmodified portions of the component based on respective data structures stored in a decision registry that are associated with the respective outputs from portions of a component of the vehicle.

In response, at operation 604, the example process 600 may comprise determining respective first frequencies at which the data structures associated with unmodified portions of the component appear in association with data structures associated with the modified portions of the component before the modification. Then, at operation 606, example process 600 may comprise determining respective second frequencies at which the data structures associated with unmodified portions of the component appear in association with data structures associated with the modified portions of the component after the modification. Then, at operation 608, the example process 600 may comprise determining, for individual unmodified portions of the component, a respective ratio of the respective second frequency to the respective first frequency.

At operation 610, the example process 600 may comprise determining if any of the respective ratios are greater than a threshold or deviate from one by an amount greater than a threshold. If so, the process may continue to operation 612. If not, the process may continue to operation 614.

At operation 612, the example process 600 may comprise flagging the unmodified portion(s) of the component(s) associated with the respective ratio(s) which were greater than the threshold or deviated from one by more than a threshold amount as being impacted by the modification of the modified portions of the component. On the other hand, at operation 614, the example process 600 may comprise outputting an indication that the unmodified portions of the component are likely not impacted by the modification of the modified portions of the component.

Figure 7:
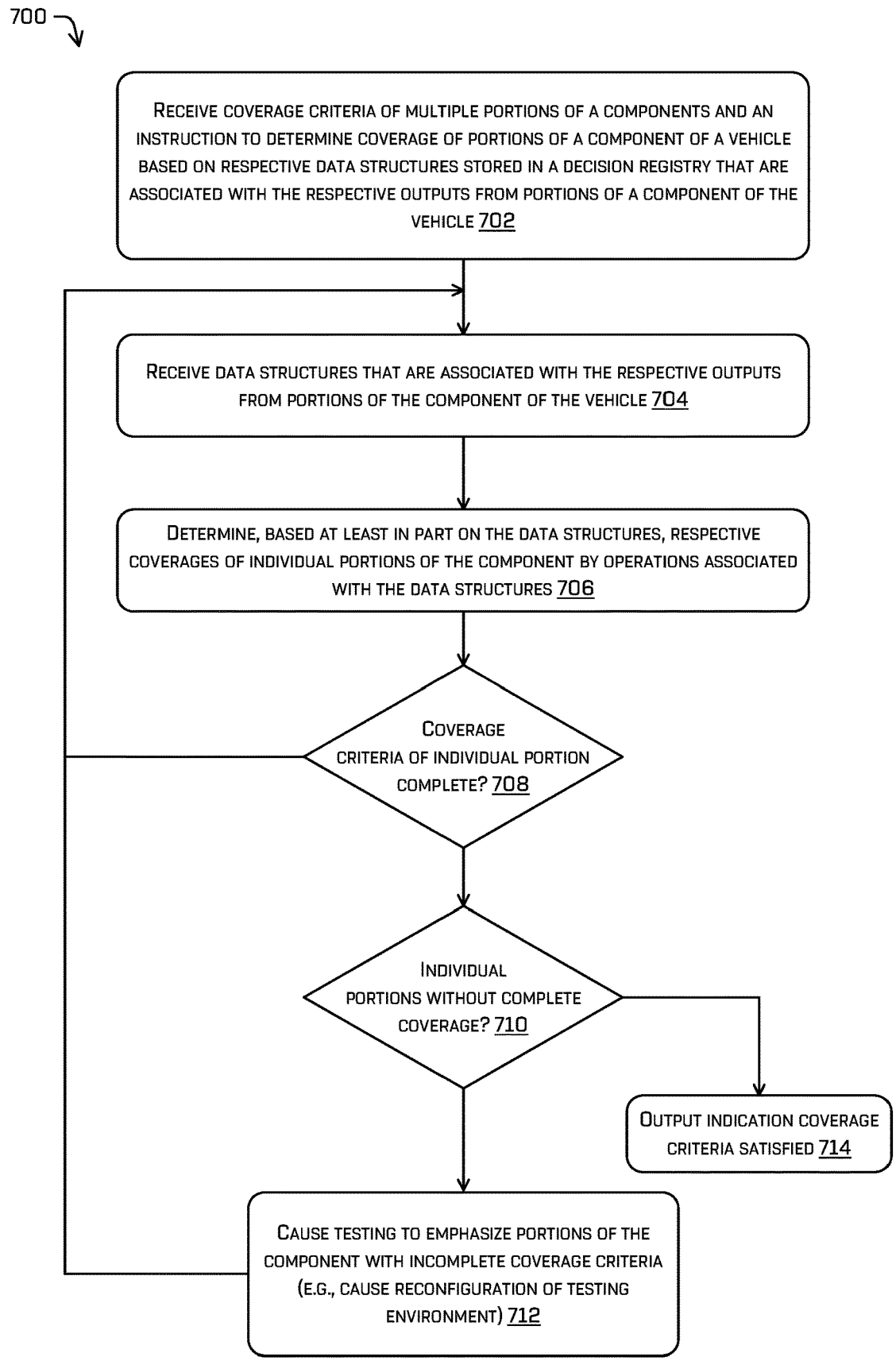
FIG. 7 illustrates a flow diagram of an example process for determining, using the decision registry, portions of a component that have been covered satisfactorily during testing and the causing further testing to focus on portions with incomplete coverage according to the techniques described herein.

Example Process for Determining Satisfied Coverage Criteria and Causing Further Testing to Focus on Unsatisfied Coverage Criteria FIG. 7 illustrates a flow diagram of an example process 700 for determining, using the decision registry, portions of a component that have been covered satisfactorily during testing and causing further testing to focus on portions with incomplete coverage. In some examples, example process 700 may be initiated during testing of the system. For example, the system may continuously, or in batches, analyze the data structures being added to the decision registry to determine portions of components being executed. Example process 700 may be conducted on-vehicle or on a remote computing device, depending on the use case—at least part of example process 700 may be used in conjunction with one or more simulations and/or in conjunction with one or more on-vehicle executions.

At operation 702, example process 700 may comprise receiving coverage criteria of multiple portions of a components and an instruction to determine coverage of portions of a component of a vehicle based on respective data structures stored in a decision registry that are associated with the respective outputs from portions of a component of the vehicle. The coverage criteria may specify coverages desired for different portions of the components and/or testing scenarios associated with the portions of the components (e.g., 800 executions of the double parked vehicle exception component that include a first set of ranges of test conditions (e.g., distances between objects, driving speeds, other objects, vehicles and/or pedestrians), 500 executions of the double parked vehicle exception component that includes a second set of ranges of test conditions, 500 executions of a distance to pedestrian component that includes a third set of ranges of test conditions).

At operation 704, example process 700 may include receiving data structures that are associated with the respective outputs from portions of the component(s) of the vehicle. At operation 706, example process 700 may comprise determining, based at least in part on the data structures, respective coverages of individual portions of the component by operations associated with the data structures. For example, the system may determine a count of data structures output by a decision registry output point and/or the paths within the component executed to generate the outputs. Additionally or alternatively, the system may determine respective traces for the data structures and, based on the traces, determine portions of the components executed to produce the output associated with the data structures.

At operation 708, the example process 700 may determine whether the coverage criteria of individual portion(s) of the component have been completed. For example, the system may aggregate respective coverages produced by the executions to determine a current coverage of the testing of the system. The current coverage of the testing may be compared to coverage criteria for the testing. If coverage criteria for an individual portion has been completed, the process may continue to operation 710. Otherwise, the process may return to operation 704.

At operation 710, the example process 700 may determine whether individual portions remain that do not have completed coverage criteria. If so, the process may continue to 712. Otherwise, the process may continue to 714.

At operation 712, the example process 700 may cause the testing to emphasize portions of the component(s) with incomplete coverage criteria. For example, the system may request or otherwise cause a reconfiguration of the testing environment, notify a test monitor that test scenarios directed at the portions of the component with complete coverage may be skipped in favor of test scenarios directed at the portions of the component with incomplete coverage, and so on. The process may then return to 704.

At operation 714, the example process 700 may output an indication that the coverage criteria have been satisfied. Based on this indication, the testing may be ended or new tests may be started.

Example Clauses

Clause A. A method comprising: receiving an indication of an error in controlling a vehicle; determining, based on the indication of the error in controlling the vehicle, a first data structure, output by a component of the vehicle; determining, based at least in part on the first data structure, a second data structure stored in a decision registry associated with the first data structure; determining an absence of errors associated with the second data structure; and based at least in part on the determining the absence of errors associated with the second data structure outputting an indication that the error in controlling the vehicle was not caused by the component.

Clause B. The method of clause A, wherein the determining the second data structure comprises: determining, based at least in part on the first data structure, a first trace associated with the first data structure; and determining the first trace matches with a second trace associated with the second data structure.

Clause C. The method of clause B, wherein the determining the first trace matches with the second trace is performed based at least in part on a machine learned model trained to determine similar traces.

Clause D. The method of clause A, further comprising: determining, based at least in part on the first data structure, a plurality of third data structures stored in the decision registry associated with the first data structure; determining whether errors associated with the plurality of third data structures are absent; and determining a frequency of errors associated with the second data structure and the plurality of third data structures being absent is greater than a frequency threshold, wherein the outputting the indication that the error in controlling the vehicle was not caused by the component is based at least in part on the frequency of errors being greater than the frequency threshold.

Clause E. The method of clause A, wherein the component comprises a portion of a system of the vehicle including a plurality of decision registry output points associated with one or more code paths, the plurality of decision registry output points generating data structures and wherein a first decision registry output point of the plurality of decision registry output points output the first data structure.

Clause F. The method of clause A, further comprising: receiving an indication of a second error in controlling a vehicle; determining, based on the indication of the second error in controlling the vehicle, a third data structure, output by a second component of the vehicle; determining, based at least in part on the third data structure, a fourth data structure stored in the decision registry associated with the third data structure; determining a presence of a third error associated with the fourth data structure; and in response to the determining the presence of the third error, determining a fifth data structure based at least in part on a first portion of a trace associated with the fourth data structure matching a first portion of another trace associated with the fifth data structure and a second portion of the trace associated with the fourth data structure not matching a second portion of the other trace associated with the fifth data structure; determining an absence of errors associated with the fifth data structure; and based at least in part on the determining the absence of errors associated with the fifth data structure, outputting an indication that code associated with the second portion of the trace associated with the fourth data structure may be a source of the second error.

Clause G. The method of clause A, wherein the data structure comprises: a timestamp associated with execution of the component, a status associated with the component, an output of the component, and an indication of sources of inputs used to determining the output of the component.

Clause H. A system comprising: one or more processors; and a memory storing processor-executable instructions that, when executed by the one or more processors, cause the system to perform operations comprising: based on a first data structure generated at a first registry point of a component of a vehicle, determining a second data structure stored in a decision registry; and performing at least one action based on the first data structure and the second data structure.

Clause I. The system of clause H, wherein the operations further comprise: receiving an indication of an error in controlling a vehicle; determining, based on the indication of the error in controlling the vehicle, that the first data structure is associated with the error, wherein the determining the second data structure stored in the decision registry is based at least in part on the determining the first data structure is associated with the error; determining an absence of errors associated with the second data structure; and based at least in part on the determining the absence of errors associated with the second data structure, outputting an indication that the error in controlling the vehicle was not caused by the component.

Clause J. The system of clause I, wherein the determining the second data structure comprises: determining, based at least in part on the first data structure, a first trace associated with the first data structure; and determining the first trace matches with a second trace associated with the second data structure.

Clause K. The system of clause I, wherein the operations further comprise: determining, based at least in part on the first data structure, a plurality of third data structures stored in the decision registry associated with the first data structure; determining whether errors associated with the plurality of third data structures are absent; and determining a frequency of errors associated with the second data structure and the plurality of third data structures being absent is greater than a frequency threshold, wherein the outputting the indication that the error in controlling the vehicle was not caused by the component is based at least in part on the frequency of errors being greater than the frequency threshold.

Clause L. The system of clause I, wherein the component comprises a portion of a system of the vehicle including a plurality of decision registry output points associated with one or more code paths, the plurality of decision registry output points generating data structures and wherein a first decision registry output point of the plurality of decision registry output points output the first data structure.

Clause M. The system of clause I, wherein the operations further comprise: receiving an indication of a second error in controlling a vehicle; determining, based on the indication of the second error in controlling the vehicle, a third data structure, output by a second component of the vehicle; determining, based at least in part on the third data structure, a fourth data structure stored in the decision registry associated with the third data structure; determining a presence of a third error associated with the fourth data structure; and in response to the determining the presence of the third error, determining a fifth data structure based at least in part on a first portion of a trace associated with the fourth data structure matching a first portion of another trace associated with the fifth data structure and a second portion of the trace associated with the fourth data structure not matching a second portion of the other trace associated with the fifth data structure; determining an absence of errors associated with the fifth data structure; and based at least in part on the determining the absence of errors associated with the fifth data structure, outputting an indication that code associated with the second portion of the trace associated with the fourth data structure may be a source of the second error.

Clause N. The system of clause H, wherein: the determining the second data structure based on the first data structure determines one or more second data structures stored in the decision registry and the first registry point is associated with a modified portion of the component; and the determining the one or more second data structures stored in the decision registry comprises: determining one or more pre-modification data structures in the decision registry that were stored prior to a modification to the modified portion of the component that are output by one or more unmodified portions of the component in association with one or more pre-modification executions of the modified portion of the component; determining a pre-modification frequency of the output of the one or more pre-modification data structures with respect to the one or more pre-modification executions of the modified portion of the component; determining one or more post-modification data structures in the decision registry that were stored after the modification to the modified portion of the component that are output by the one or more unmodified portions of the component in association with one or more post-modification executions of the modified portion of the component; determining a post-modification frequency of the output of the one or more post-modification data structures with respect to the one or more post-modification executions of the modified portion of the component; and determining a ratio of the post-modification frequency to the pre-modification frequency; wherein the at least one action is based at least in part on the ratio.

Clause O. The system of clause N, wherein the ratio is within a threshold and the operations further comprise outputting an indication that the unmodified portions of the component are likely not impacted by the modification of the modified portion of the component.

Clause P. The system of clause N, wherein the ratio is outside of a threshold and the operations further comprise outputting an indication that the unmodified portions of the component are likely impacted by the modification of the modified portion of the component.

Clause Q. One or more non-transitory computer-readable media storing processor-executable instructions that, when executed by one or more processors, cause the one or more processors to perform operations comprising: based on a first data structure generated at a first registry point of a component of a vehicle, determining a second data structure stored in a decision registry; and performing at least one action based on the first data structure and the second data structure.

Clause R. The one or more non-transitory computer-readable media of clause Q, wherein the operations further comprise: receiving an indication of an error in controlling a vehicle; determining, based on the indication of the error in controlling the vehicle, that the first data structure is associated with the error, wherein the determining the second data structure stored in the decision registry is based at least in part on the determining the first data structure is associated with the error; determining an absence of errors associated with the second data structure; and based at least in part on the determining the absence of errors associated with the second data structure, outputting an indication that the error in controlling the vehicle was not caused by the component.

Clause S. The one or more non-transitory computer-readable media of clause R, wherein the operations further comprise: receiving an indication of a second error in controlling a vehicle; determining, based on the indication of the second error in controlling the vehicle, a third data structure, output by a second component of the vehicle; determining, based at least in part on the third data structure, a fourth data structure stored in the decision registry associated with the third data structure; determining a presence of a third error associated with the fourth data structure; and in response to the determining the presence of the third error, determining a fifth data structure based at least in part on a first portion of a trace associated with the fourth data structure matching a first portion of another trace associated with the fifth data structure and a second portion of the trace associated with the fourth data structure not matching a second portion of the other trace associated with the fifth data structure; determining an absence of errors associated with the fifth data structure; and based at least in part on the determining the absence of errors associated with the fifth data structure, outputting an indication that code associated with the second portion of the trace associated with the fourth data structure may be a source of the second error.

Clause T. The one or more non-transitory computer-readable media of clause Q, wherein: the determining the second data structure based on the first data structure determines one or more second data structures stored in the decision registry; the first registry point is associated with a modified portion of the component; and the determining the one or more second data structures stored in the decision registry comprises: determining one or more pre-modification data structures in the decision registry that were stored prior to a modification to the modified portion of the component that are output by one or more unmodified portions of the component in association with one or more pre-modification executions of the modified portion of the component; determining a pre-modification frequency of the output of the one or more pre-modification data structures with respect to the one or more pre-modification executions of the modified portion of the component; determining one or more post-modification data structures in the decision registry that were stored after the modification to the modified portion of the component that are output by the one or more unmodified portions of the component in association with one or more post-modification executions of the modified portion of the component; determining a post-modification frequency of the output of the one or more post-modification data structures with respect to the one or more post-modification executions of the modified portion of the component; and determining a ratio of the post-modification frequency to the pre-modification frequency; the at least one action comprises one of: outputting an indication that the unmodified portions of the component are likely not impacted by the modification of the modified portions of the component at least partially in response to the ratio being within a threshold; or outputting an indication that the unmodified portions of the component are likely impacted by the modification of the modified portions of the component at least partially in response to the ratio being outside a threshold.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving an indication of an error in controlling a vehicle;
   determining, based on the indication of the error in controlling the vehicle, a first data structure, output by a component of the vehicle;
   determining, based at least in part on the first data structure, a second data structure stored in a decision registry associated with the first data structure;
   determining an absence of errors associated with the second data structure; and
   based at least in part on the determining the absence of errors associated with the second data structure, outputting an indication that the error in controlling the vehicle was not caused by the component;
   wherein the component comprises a portion of a system of the vehicle including a plurality of decision registry output points associated with one or more code paths, the plurality of decision registry output points generating data structures and wherein a first decision registry output point of the plurality of decision registry output points output the first data structure.

2. The method of claim 1, wherein the determining the second data structure comprises:
   determining, based at least in part on the first data structure, a first trace associated with the first data structure; and
   determining the first trace matches with a second trace associated with the second data structure.

3. The method of claim 2, wherein the determining the first trace matches with the second trace is performed based at least in part on a machine learned model trained to determine similar traces.

4. The method of claim 1, further comprising:
   determining, based at least in part on the first data structure, a plurality of third data structures stored in the decision registry associated with the first data structure;
   determining whether errors associated with the plurality of third data structures are absent; and
   determining a frequency of errors associated with the second data structure and the plurality of third data structures being absent is greater than a frequency threshold, wherein the outputting the indication that the error in controlling the vehicle was not caused by the component is based at least in part on the frequency of errors being greater than the frequency threshold.

5. The method of claim 1, further comprising:
   receiving an indication of a second error in controlling a vehicle;
   determining, based on the indication of the second error in controlling the vehicle, a third data structure, output by a second component of the vehicle;
   determining, based at least in part on the third data structure, a fourth data structure stored in the decision registry associated with the third data structure;
   determining a presence of a third error associated with the fourth data structure; and
   in response to the determining the presence of the third error, determining a fifth data structure based at least in part on a first portion of a trace associated with the fourth data structure matching a first portion of another trace associated with the fifth data structure and a second portion of the trace associated with the fourth data structure not matching a second portion of the other trace associated with the fifth data structure;
   determining an absence of errors associated with the fifth data structure; and
   based at least in part on the determining the absence of errors associated with the fifth data structure, outputting an indication that code associated with the second portion of the trace associated with the fourth data structure may be a source of the second error.

6. The method of claim 1, wherein the first data structure comprises:
   a timestamp associated with execution of the component,
   a status associated with the component,
   an output of the component, and
   an indication of sources of inputs used to determining the output of the component.

7. A system comprising:
   one or more processors; and
   a memory storing processor-executable instructions that, when executed by the one or more processors, cause the system to perform operations comprising:

based on a first data structure generated at a first registry point of a component of a vehicle, determining a second data structure stored in a decision registry; and performing at least one action based on the first data structure and the second data structure;

wherein the operations further comprise:
receiving an indication of an error in controlling a vehicle;
determining, based on the indication of the error in controlling the vehicle, that the first data structure is associated with the error, wherein the determining the second data structure stored in the decision registry is based at least in part on the determining the first data structure is associated with the error;
determining an absence of errors associated with the second data structure; and
based at least in part on the determining the absence of errors associated with the second data structure, outputting an indication that the error in controlling the vehicle was not caused by the component.

8. The system of claim 7, wherein the determining the second data structure comprises:
determining, based at least in part on the first data structure, a first trace associated with the first data structure; and
determining the first trace matches with a second trace associated with the second data structure.

9. The system of claim 7, wherein the operations further comprise:
determining, based at least in part on the first data structure, a plurality of third data structures stored in the decision registry associated with the first data structure;
determining whether errors associated with the plurality of third data structures are absent; and
determining a frequency of errors associated with the second data structure and the plurality of third data structures being absent is greater than a frequency threshold, wherein the outputting the indication that the error in controlling the vehicle was not caused by the component is based at least in part on the frequency of errors being greater than the frequency threshold.

10. The system of claim 7, wherein the component comprises a portion of a system of the vehicle including a plurality of decision registry output points associated with one or more code paths, the plurality of decision registry output points generating data structures and wherein a first decision registry output point of the plurality of decision registry output points output the first data structure.

11. The system of claim 7, wherein the operations further comprise:
receiving an indication of a second error in controlling a vehicle;
determining, based on the indication of the second error in controlling the vehicle, a third data structure, output by a second component of the vehicle;
determining, based at least in part on the third data structure, a fourth data structure stored in the decision registry associated with the third data structure;
determining a presence of a third error associated with the fourth data structure; and
in response to the determining the presence of the third error, determining a fifth data structure based at least in part on a first portion of a trace associated with the fourth data structure matching a first portion of another trace associated with the fifth data structure and a second portion of the trace associated with the fourth data structure not matching a second portion of the other trace associated with the fifth data structure;
determining an absence of errors associated with the fifth data structure; and
based at least in part on the determining the absence of errors associated with the fifth data structure, outputting an indication that code associated with the second portion of the trace associated with the fourth data structure may be a source of the second error.

12. The system of claim 7, wherein the first data structure comprises:
a timestamp associated with execution of the component,
a status associated with the component,
an output of the component, and
an indication of sources of inputs used to determining the output of the component.

13. A system comprising:
one or more processors; and
a memory storing processor-executable instructions that, when executed by the one or more processors, cause the system to perform operations comprising:
based on a first data structure generated at a first registry point of a component of a vehicle, determining a second data structure stored in a decision registry; and
performing at least one action based on the first data structure and the second data structure;
wherein:
the determining the second data structure based on the first data structure determines one or more second data structures stored in the decision registry and the first registry point is associated with a modified portion of the component; and
the determining the one or more second data structures stored in the decision registry comprises:
determining one or more pre-modification data structures in the decision registry that were stored prior to a modification to the modified portion of the component that are output by one or more unmodified portions of the component in association with one or more pre-modification executions of the modified portion of the component;
determining a pre-modification frequency of the output of the one or more pre-modification data structures with respect to the one or more pre-modification executions of the modified portion of the component;
determining one or more post-modification data structures in the decision registry that were stored after the modification to the modified portion of the component that are output by the one or more unmodified portions of the component in association with one or more post-modification executions of the modified portion of the component;
determining a post-modification frequency of the output of the one or more post-modification data structures with respect to the one or more post-modification executions of the modified portion of the component; and
determining a ratio of the post-modification frequency to the pre-modification frequency;
wherein the at least one action is based at least in part on the ratio.

14. The system of claim 13, wherein the ratio is within a threshold and the operations further comprise outputting an indication that the unmodified portions of the component are likely not impacted by the modification of the modified portion of the component.

15. The system of claim 13, wherein the ratio is outside of a threshold and the operations further comprise outputting an indication that the unmodified portions of the component are likely impacted by the modification of the modified portion of the component.

16. The system of claim 13, wherein the first data structure comprises:
   a timestamp associated with execution of the component,
   a status associated with the component,
   an output of the component, and
   an indication of sources of inputs used to determining the output of the component.

17. One or more non-transitory computer-readable media storing processor-executable instructions that, when executed by one or more processors, cause the one or more processors to perform operations comprising:
   based on a first data structure generated at a first registry point of a component of a vehicle, determining a second data structure stored in a decision registry; and
   performing at least one action based on the first data structure and the second data structure;
   wherein the operations further comprise:
      receiving an indication of an error in controlling a vehicle;
      determining, based on the indication of the error in controlling the vehicle, that the first data structure is associated with the error, wherein the determining the second data structure stored in the decision registry is based at least in part determining an absence of errors associated with the second data structure; and
      based at least in part on the determining the absence of errors associated with the second data structure, outputting an indication that the error in controlling the vehicle was not caused by the component.

18. The one or more non-transitory computer-readable media of claim 17, wherein the operations further comprise:
   receiving an indication of a second error in controlling a vehicle;
   determining, based on the indication of the second error in controlling the vehicle, a third data structure, output by a second component of the vehicle;
   determining, based at least in part on the third data structure, a fourth data structure stored in the decision registry associated with the third data structure;
   determining a presence of a third error associated with the fourth data structure; and
   in response to the determining the presence of the third error, determining a fifth data structure based at least in part on a first portion of a trace associated with the fourth data structure matching a first portion of another trace associated with the fifth data structure and a second portion of the trace associated with the fourth data structure not matching a second portion of the other trace associated with the fifth data structure;
   determining an absence of errors associated with the fifth data structure; and based at least in part on the determining the absence of errors associated with the fifth data structure, outputting an indication that code associated with the second portion of the trace associated with the fourth data structure may be a source of the second error.

19. The one or more non-transitory computer-readable media of claim 17, wherein:
   the determining the second data structure based on the first data structure determines one or more second data structures stored in the decision registry;
   the first registry point is associated with a modified portion of the component; and
   the determining the one or more second data structures stored in the decision registry comprises:
      determining one or more pre-modification data structures in the decision registry that were stored prior to a modification to the modified portion of the component that are output by one or more unmodified portions of the component in association with one or more pre-modification executions of the modified portion of the component;
      determining a pre-modification frequency of the output of the one or more pre-modification data structures with respect to the one or more pre-modification executions of the modified portion of the component;
      determining one or more post-modification data structures in the decision registry that were stored after the modification to the modified portion of the component that are output by the one or more unmodified portions of the component in association with one or more post-modification executions of the modified portion of the component;
      determining a post-modification frequency of the output of the one or more post-modification data structures with respect to the one or more post-modification executions of the modified portion of the component; and
      determining a ratio of the post-modification frequency to the pre-modification frequency;
   the at least one action comprises one of:
      outputting an indication that the unmodified portions of the component are likely not impacted by the modification of the modified portions of the component at least partially in response to the ratio being within a threshold; or
      outputting an indication that the unmodified portions of the component are likely impacted by the modification of the modified portions of the component at least partially in response to the ratio being outside a threshold.

20. The one or more non-transitory computer-readable media of claim 17, wherein the first data structure comprises:
   a timestamp associated with execution of the component,
   a status associated with the component,
   an output of the component, and
   an indication of sources of inputs used to determining the output of the component.

* * * * *